US012747996B2

(12) United States Patent
Kato et al.

(10) Patent No.: US 12,747,996 B2
(45) Date of Patent: Sep. 29, 2026

(54) SENSOR UNIT AND SENSOR ASSEMBLY

(71) Applicant: Yazaki Corporation, Tokyo (JP)

(72) Inventors: Shinpei Kato, Makinohara (JP); Shingo Nomoto, Makinohara (JP); Keisuke Yamauchi, Makinohara (JP); Shimpei Ando, Makinohara (JP); Tadashi Ogawa, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 268 days.

(21) Appl. No.: 18/741,965

(22) Filed: Jun. 13, 2024

(65) Prior Publication Data

US 2025/0020519 A1 Jan. 16, 2025

(30) Foreign Application Priority Data

Jul. 14, 2023 (JP) ................................ 2023-116011

(51) Int. Cl.
*G01K 7/22* (2006.01)

(52) U.S. Cl.
CPC .................................... *G01K 7/22* (2013.01)

(58) Field of Classification Search
CPC ........ G01K 7/22; G01K 2205/00; G01K 1/08; G01K 13/026; G01K 1/14
See application file for complete search history.

(56) References Cited

U.S. PATENT DOCUMENTS

| | | | | |
|---|---|---|---|---|
| 2004/0118227 | A1 | 6/2004 | Tokunaga et al. | |
| 2005/0109619 | A1 * | 5/2005 | Yosiyasu ............ | G01N 27/4071 204/424 |
| 2010/0124665 | A1 * | 5/2010 | Maegawa .............. | H05K 3/325 428/457 |
| 2013/0205872 | A1 * | 8/2013 | Katou ................ | G01N 33/0009 73/31.07 |
| 2019/0383668 | A1 * | 12/2019 | Matsunaga .............. | G01K 1/08 |

FOREIGN PATENT DOCUMENTS

| | | | | |
|---|---|---|---|---|
| EP | 2 485 023 | B1 | 11/2017 | |
| JP | 2002156290 | A * | 5/2002 | |
| JP | 2004198240 | A * | 7/2004 | ............... G01K 7/16 |
| JP | 2017191863 | A * | 10/2017 | |

* cited by examiner

*Primary Examiner* — Peter J Macchiarolo
*Assistant Examiner* — Mireille S Sadate-Moualeu
(74) *Attorney, Agent, or Firm* — Sughrue Mion, PLLC

(57) ABSTRACT

A sensor unit according to the present disclosure includes: a sensor element; a pair of conductive members that extend in parallel with each other from the sensor element; and a resin-molded portion that covers part of the pair of conductive members. The pair of conductive members each includes: a base end portion connected to the sensor element; a tip end portion on an opposite side to the base end portion; and an intermediate portion that is a part between the base end portion and the tip end portion, the intermediate portion including a through-hole. The resin-molded portion covers the base end portion and the intermediate portion while the tip portion is exposed.

6 Claims, 9 Drawing Sheets

SENSOR UNIT AND SENSOR ASSEMBLY

BACKGROUND OF THE INVENTION

Field of the Invention

Embodiments of the present invention relate to a sensor unit and a sensor assembly.

Priority is claimed on Japanese Patent Application No. 2023-116011, filed Jul. 14, 2023, the content of which is incorporated herein by reference.

Description of Related Art

Conventionally, the state of a fluid or the like in a structural body can be measured by a sensor. For example, European Patent No. 2485023 discloses a sensor unit that is provided on a wall of a flow passage of an engine to measure the temperature of a fluid such as a lubricant, a coolant, or a fuel.

SUMMARY OF THE INVENTION

The sensor unit disclosed in European Patent No. 2485023 has a structure in which a polymer body is molded on a lead conductor connected to a temperature sensor element. Hence, the polymer body may be come off from the lead conductor.

According to an embodiment of the present invention, a sensor unit and a sensor assembly are provided in which a resin-molded portion can be suppressed from coming off from a pair of conductive members of the sensor assembly.

A sensor unit according to an embodiment of the present invention includes a sensor element; a pair of conductive members that extend in parallel with each other from the sensor element; and a resin-molded portion that covers part of the pair of conductive members. The pair of conductive members each includes: a base end portion connected to the sensor element; a tip end portion on the opposite side to the base end portion; and an intermediate portion that is a part between the base end portion and the tip end portion, the intermediate portion including a through-hole. The resin-molded portion covers the base end portion and the intermediate portion while the tip end portion is exposed.

A sensor assembly according to an embodiment of the present invention includes a sensor element; and a pair of conductive members that extend in parallel with each other from the sensor element. The pair of conductive members each includes: a base end portion connected to the sensor element; a tip end portion on the opposite side to the base end portion; and an intermediate portion that is a part between the base end portion and the tip end portion, the intermediate portion including a through-hole.

According to the sensor unit or the sensor assembly in one embodiment of the present invention, a resin-molded portion can be suppressed from coming off from a pair of conductive members of the sensor assembly.

DETAILED DESCRIPTION OF THE INVENTION

Embodiments

Hereinafter, a sensor unit and a sensor assembly according to embodiments will be described with reference to the drawings. A sensor unit 9 in the present embodiment is provided in a structural body such as a flow passage through which a fluid flows or a tank in which a fluid is stored in order to measure the temperature of the fluid such as cooling water or oil.

(Constitution of Sensor Unit)

Figure 1:
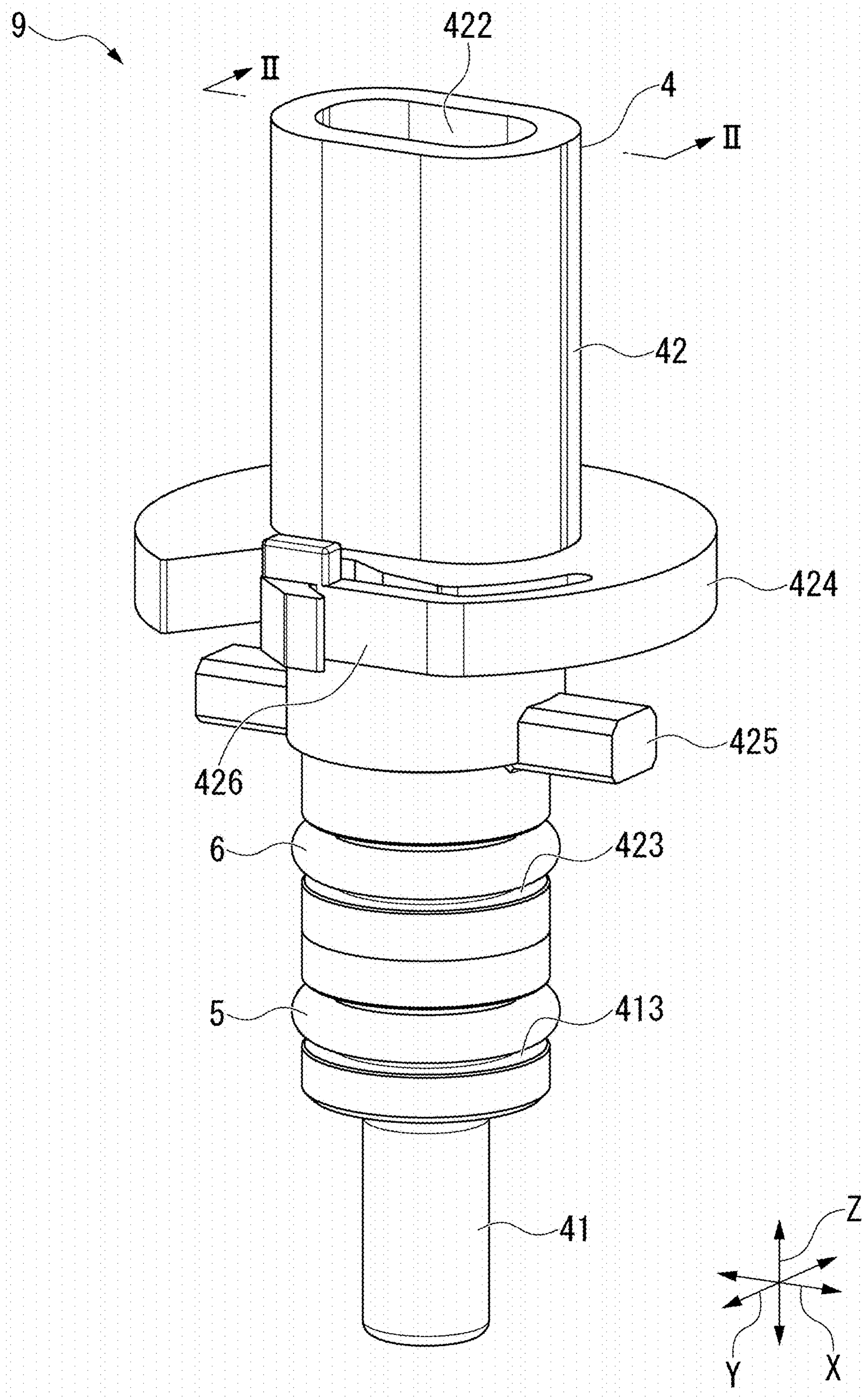
FIG. 1 is a perspective view of a sensor unit according to an embodiment.
Figure 2:
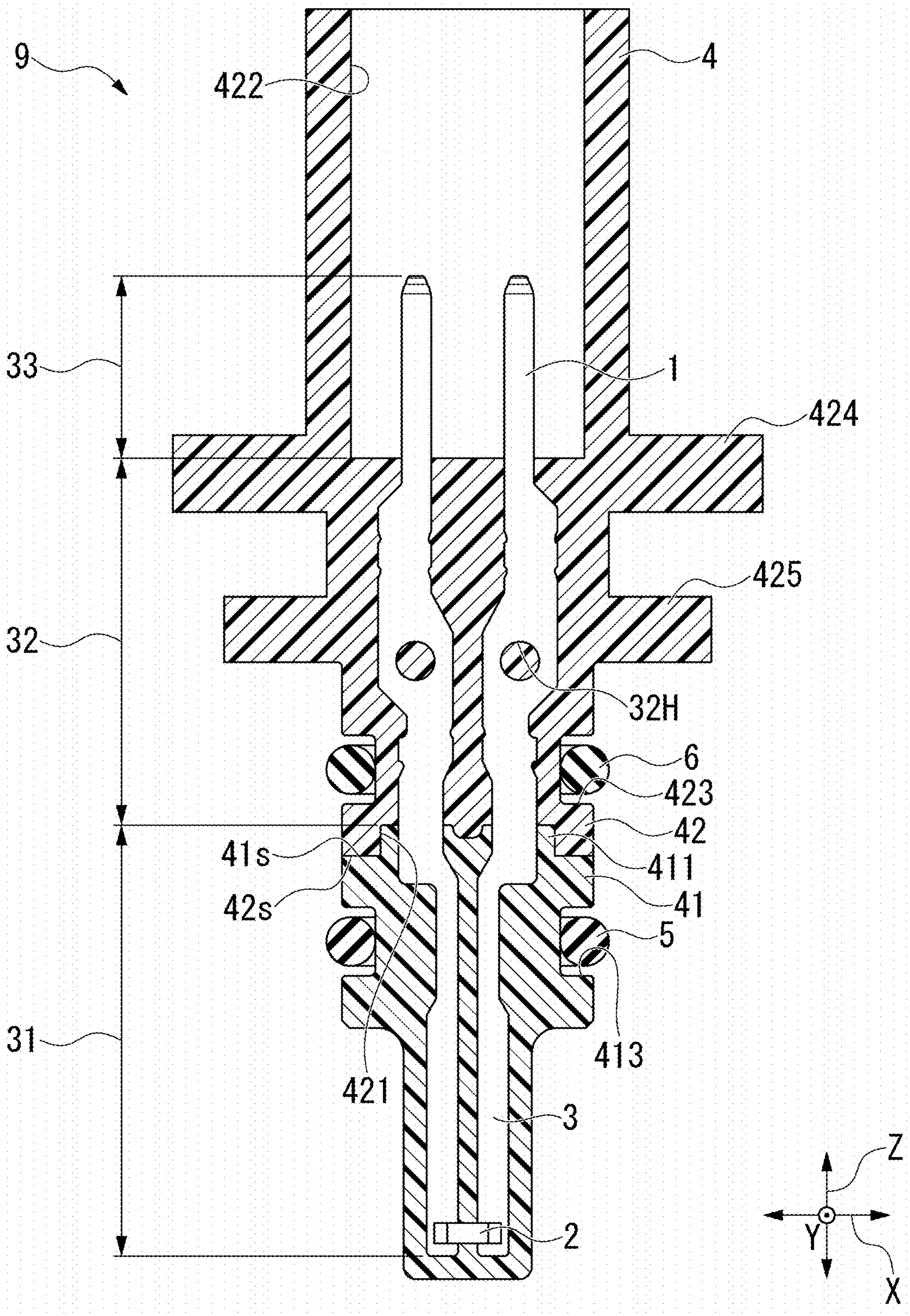
FIG. 2 is a cross-sectional view taken along line II-II of FIG. 1.

As illustrated in FIGS. 1 and 2, the sensor unit 9 in the present embodiment includes a sensor assembly 1, a resin-molded portion 4, a first seal member 5, and a second seal member 6. The sensor assembly 1 includes a sensor element 2 and a pair of conductive members 3.

(Constitution of Sensor Element)

The sensor element 2 is provided across the pair of conductive members 3. Both ends of the sensor element 2 are bonded (for example, soldered) to the pair of conductive members 3. The sensor element 2 is a temperature sensor for measuring the temperature of the fluid. The sensor element 2 is, for example, a thermistor. The electric characteristics of the sensor element 2 in accordance with the temperature of the fluid are measured via the pair of conductive members 3, and thus it is possible to measure the temperature of the fluid.

(Constitution of Conductive Member)

The pair of conductive members 3 extend in parallel with each other from the sensor element 2. In the present embodiment, the pair of conductive members 3 is a lead frame. Hereinafter, a direction in which the pair of conductive members 3 extend will be referred to as a Z direction, and directions that intersect each other on a plane that faces the Z direction will be referred to as an X direction and a Y direction. For example, the X direction, the Y direction, and the Z direction may be directions orthogonal to one another.

Figure 3:
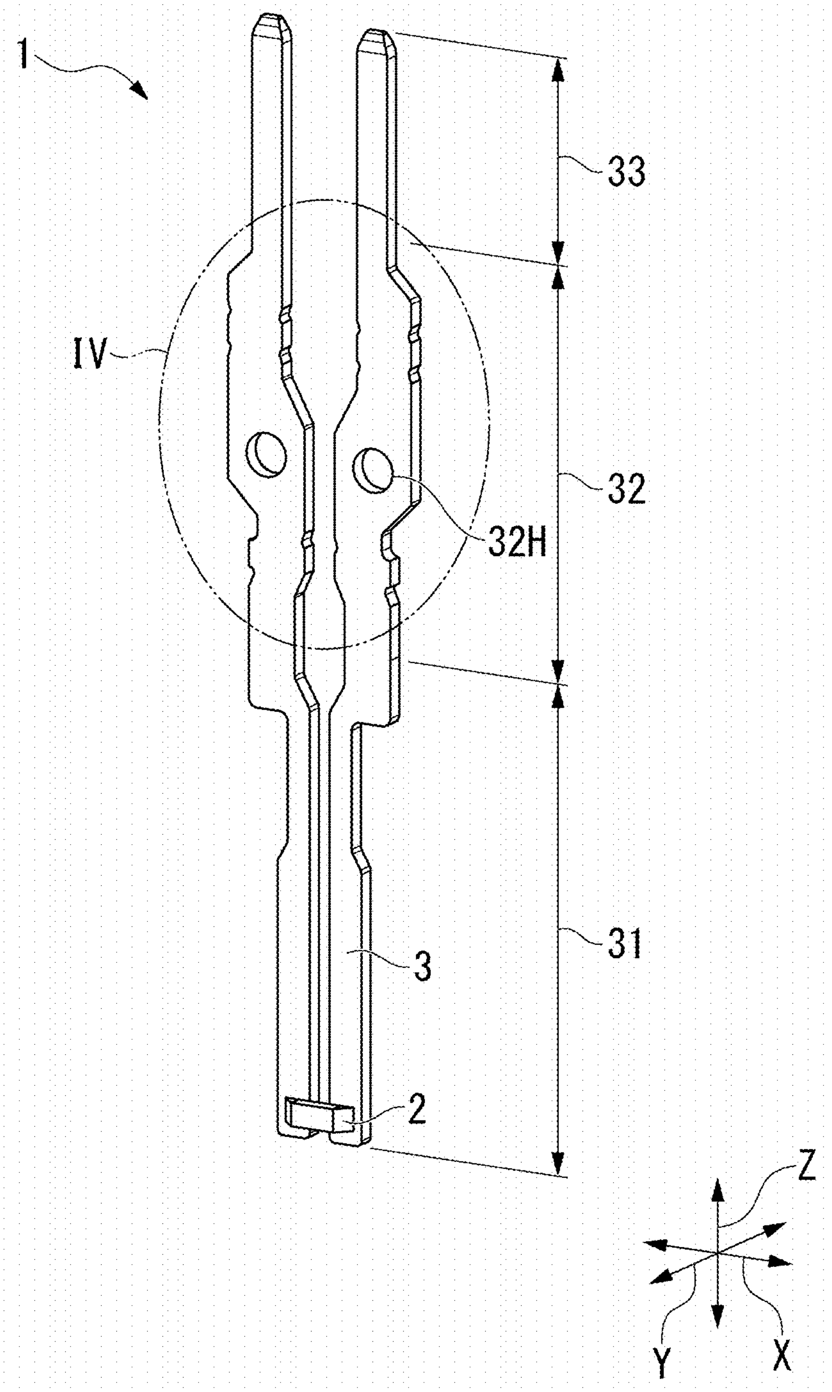
FIG. 3 is a perspective view of a sensor assembly according to an embodiment.

As illustrated in FIG. 3, each of the conductive members 3 extends in the Z direction. Each of the conductive members 3 has a plate shape with the Y direction as a plate thickness direction. Each of the conductive members 3 has a constant plate thickness over the entire conductive members 3. Each of the conductive members 3 includes a base end portion 31, an intermediate portion 32, and a tip end portion 33 sequentially in the Z direction. The base end portion 31 is one of both end portions where each of the conductive members 3 extends. The tip end portion 33 is an end portion on the opposite side to the base end portion 31 of both end portions where each of the conductive members 3 extends. The intermediate portion 32 is a part between the base end portion 31 and the tip end portion 33. The sensor element 2 is connected to an end of the base end portion 31. The tip end portion 33 is a part exposed from the resin-molded portion 4. The base end portion 31 is a part covered with a first molded portion 41 to be described later. In addition, the intermediate portion 32 is a part covered with a second molded portion 42 to be described later.

Figure 4:
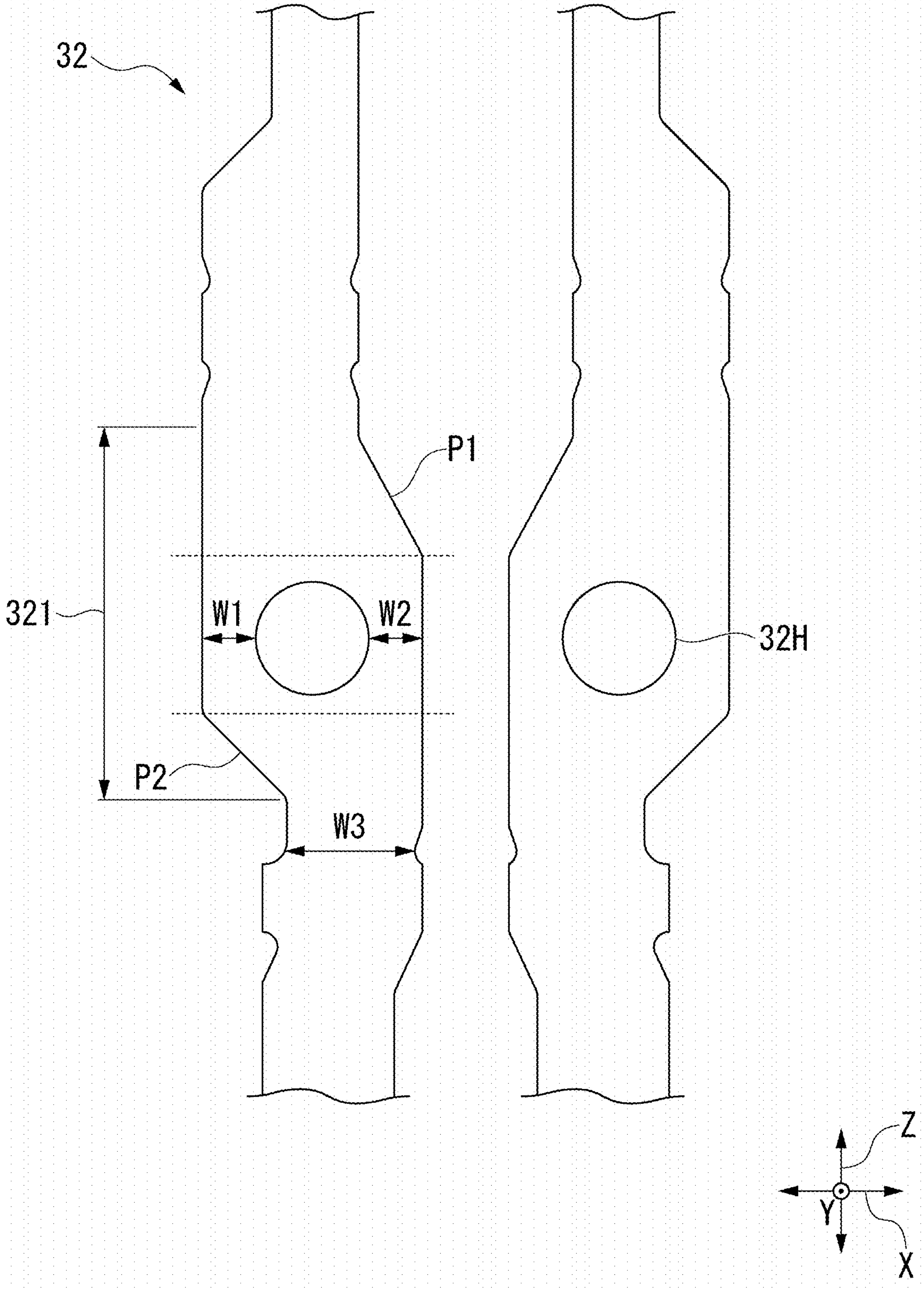
FIG. 4 is an enlarged view of a part IV in FIG. 3.

As illustrated in FIG. 4, the intermediate portion 32 includes a bent portion 321. In the bent portion 321, the pair of conductive members 3 are bent in directions away from each other in the X direction. The intermediate portion 32 includes a through-hole 32H. The through-hole 32H penetrates in the Y direction. The through-hole 32H is a circular hole. The through-hole 32H is formed in part of the bent portion 321 that is larger in width in the X direction. The bent portion 321 includes a first edge portion P1 on one side in the X direction and a second edge portion P2 on the other side in the X direction. The first edge portion P1 and the second edge portion P2 are provided at different positions in the Z direction, interposing a part where the through-hole 32H is provided. The first edge portion P1 is inclined in the X direction with respect to the Z direction so that the width in the X direction of the bent portion 321 is larger in the part where the through-hole 32H is formed. The second edge portion P2 is inclined in the X direction with respect to the Z direction so that the width in the X direction of the bent portion 321 is larger in the part where the through-hole 32H is formed. The first edge portion P1 and the second edge portion P2 are disposed in a region where the through-hole 32H is present in the Z direction. With such arrangements, remaining widths W1 and W2 in the bent portion 321 on both sides of the through-hole 32H respectively have widths by which the mechanical strength of each of the conductive members 3 can be maintained. In the present embodiment, the diameter of the through-hole 32H is larger than W1, and is larger than W2. In addition, the diameter of the through-hole 32H is larger than half of a width W3 of a part having the smallest width in the X direction in the intermediate portion 32.

(Constitution of Resin-Molded Portion)

As illustrated in FIGS. 1 and 2, the resin-molded portion 4 covers the base end portion 31 and the intermediate portion 32, and exposes the tip end portion 33. The resin-molded portion 4 includes the first molded portion 41 and the second molded portion 42. The resin-molded portion 4 is partially provided inside the through-hole 32H. In the present embodiment, after the first molded portion 41 is formed by transfer molding, the second molded portion 42 is formed by injection molding. That is, the second molded portion 42 is partially provided inside the through-hole 32H.

The first molded portion 41 is formed of a resin having different characteristics from those of the second molded portion 42. The first molded portion 41 is made of a resin that is softer than the resin that forms the second molded portion 42, and that has high thermal conductivity. As such a resin, for example, in the case where the second molded portion 42 is made of a polyamide (PA) resin or a polyphenylene sulfide (PPS) resin, the first molded portion 41 is made of an epoxy resin.

The first molded portion 41 covers the base end portion 31 and the sensor element 2 to seal the base end portion 31 and the sensor element 2. The first molded portion 41 includes a joint surface 41*s* that is joined to the second molded portion 42.

The first molded portion 41 includes a first seal groove 413. The first seal groove 413 has an annular shape that extends in a circumferential direction of an outer circumferential surface of the first molded portion 41 on the outer circumferential surface of the first molded portion 41.

Figure 5:
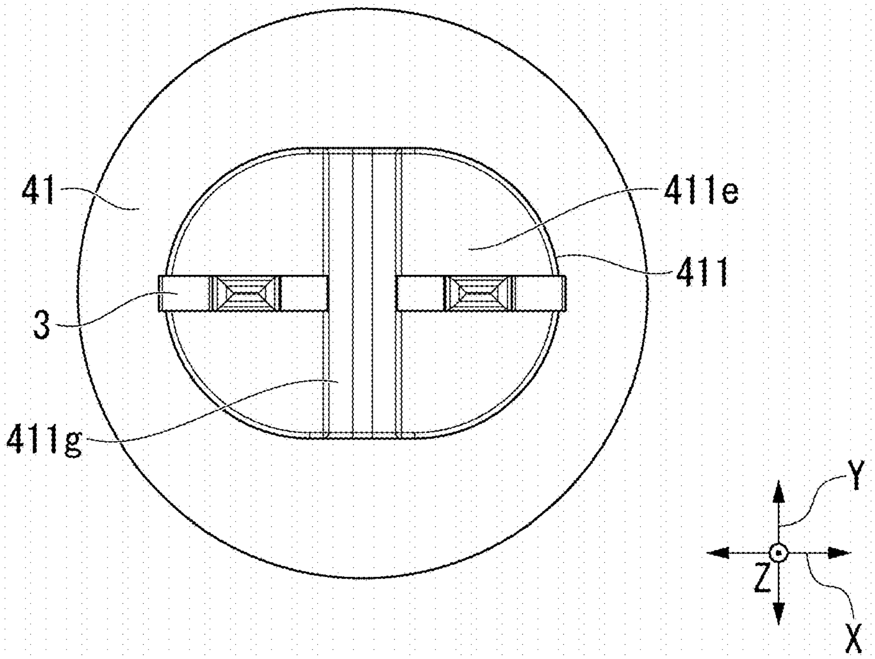
FIG. 5 is a plan view of a pair of conductive members and a first molded portion according to an embodiment.

The first molded portion 41 includes a protruding portion 411 on the joint surface 41*s*. The protruding portion 411 protrudes in the Z direction toward the second molded portion 42. The pair of conductive members 3 are disposed to pass through the protruding portion 411. As illustrated in FIG. 5, the protruding portion 411 has an elliptical shape when viewed from the Z direction, which is the joining direction of the first molded portion 41 and the second molded portion 42. A longitudinal axis direction of such an elliptical shape is the same as a direction in which the pair of conductive members 3 are disposed side by side. In the present specification, the term "elliptical" shape generally does not include a linear part, but may be any shape as long as it is a non-perfect circle and has no corner, may have a shape including a linear part in the middle, or may be a left-right asymmetrical shape such as an egg shape. On the other hand, the outer circumferential shape of the first molded portion 41, when viewed from the Z direction, is a perfect circle.

Figure 6:
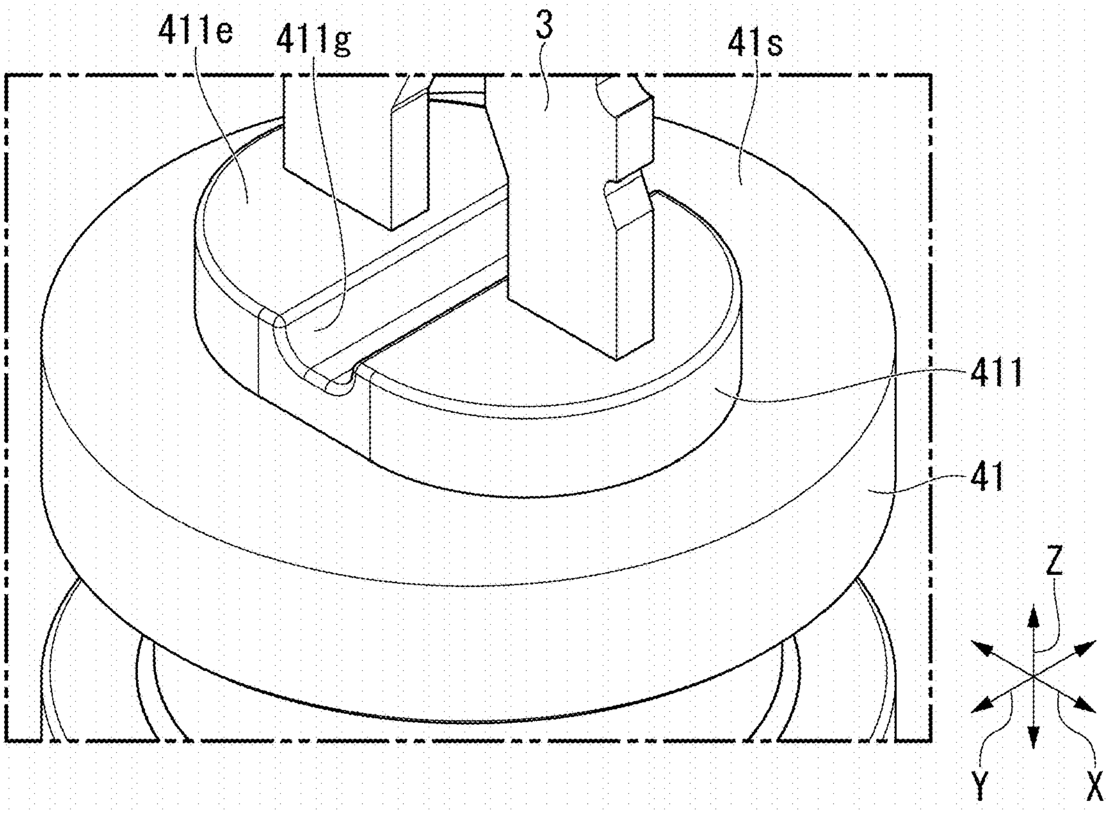
FIG. 6 is a partial perspective view of the pair of conductive members and the first molded portion according to an embodiment.

As illustrated in FIG. 6, the protruding portion 411 includes a groove portion 411*g*. The groove portion 411*g* is concave in the Z direction toward a side apart from the second molded portion 42. The groove portion 411*g* extends between the pair of conductive members 3 on an end surface 411*e* of the protruding portion 411 to traverse the end surface 411*e* when viewed from the Z direction. In the present embodiment, the width in the X direction of the groove portion 411*g* is equal to or larger than half the width in the X direction between the pair of conductive members 3. On a cross-section parallel to a ZX plane, the groove portion 411*g* has an arc shape.

The second molded portion 42 covers the intermediate portion 32 to seal the intermediate portion 32. As illustrated in FIGS. 1 and 2, the second molded portion 42 has a joint surface 42*s* that is joined to the first molded portion 41. The second molded portion 42 includes a first recessed portion 421 on the joint surface 42*s*. The first recessed portion 421 has a shape corresponding to the protruding portion 411, and is recessed in the Z direction toward a side apart from the first molded portion 41. The second molded portion 42 is joined to the first molded portion 41 in a state in which the protruding portion 411 is fit in the first recessed portion 421 and an inner circumference of the first recessed portion 421 is in contact with an outer circumference of the protruding portion 411. Due to shrinkage at the time of molding the second molded portion 42, the second molded portion 42 sandwiches the protruding portion 411 of the first molded portion 41 from both sides (both sides in the X direction and both sides in the Y direction).

The second molded portion 42 includes a second recessed portion 422 at an end on the opposite side to an end where the first recessed portion 421 is provided, out of both ends in the Z direction. The second recessed portion 422 is recessed in the Z direction toward the intermediate portion 32. In the second recessed portion 422, the respective tip end portions 33 of the pair of conductive members 3 are exposed. Therefore, the respective tip end portions 33 of the pair of conductive members 3 are respectively used as measurement terminals.

The second molded portion 42 includes a second seal groove 423. The second seal groove 423 has an annular shape that extends in a circumferential direction of an outer circumferential surface of the second molded portion 42 on the outer circumferential surface of the second molded portion 42. The second seal groove 423 is provided between the bent portion 321 and the joint surface 42*s* in the Z direction.

The second molded portion 42 includes a flange 424, a pair of extension portions 425, and a rotation stopper mechanism 426 on the outer circumference of the second molded portion 42. The flange 424 protrudes over the entire circumference of the second molded portion 42 at a position in the Z direction including a boundary between the intermediate portion 32 and the tip end portion 33. The pair of extension portions 425 protrude on both sides in the X direction at a position between the second seal groove 423 and the flange 424 in the Z direction. The rotation stopper mechanism 426 extends from the flange 424 along an outer circumference of the flange 424, and includes a hook at a tip end that extends therefrom.

(Constitutions of First Seal Member and Second Seal Member)

The first seal member 5 is an O-ring that is fit in the first seal groove 413. The second seal member 6 is an O-ring that is fit in the second seal groove 423. The first seal member 5 and the second seal member 6 are provided to sandwich the joint surface 41*s* and the joint surface 42*s*. The first seal member 5 and the second seal member 6 seal an entry path of the fluid that enters between the joint surface 41*s* and the joint surface 42*s*.

(Method for Attaching Sensor Unit)

A method for attaching the sensor unit will be described. In order to measure the temperature of the fluid such as cooling water or oil, an operator attaches the sensor unit 9 to a structural body 81 such as a flow passage through which the fluid flows or a tank in which the fluid is stored.

Figure 7:
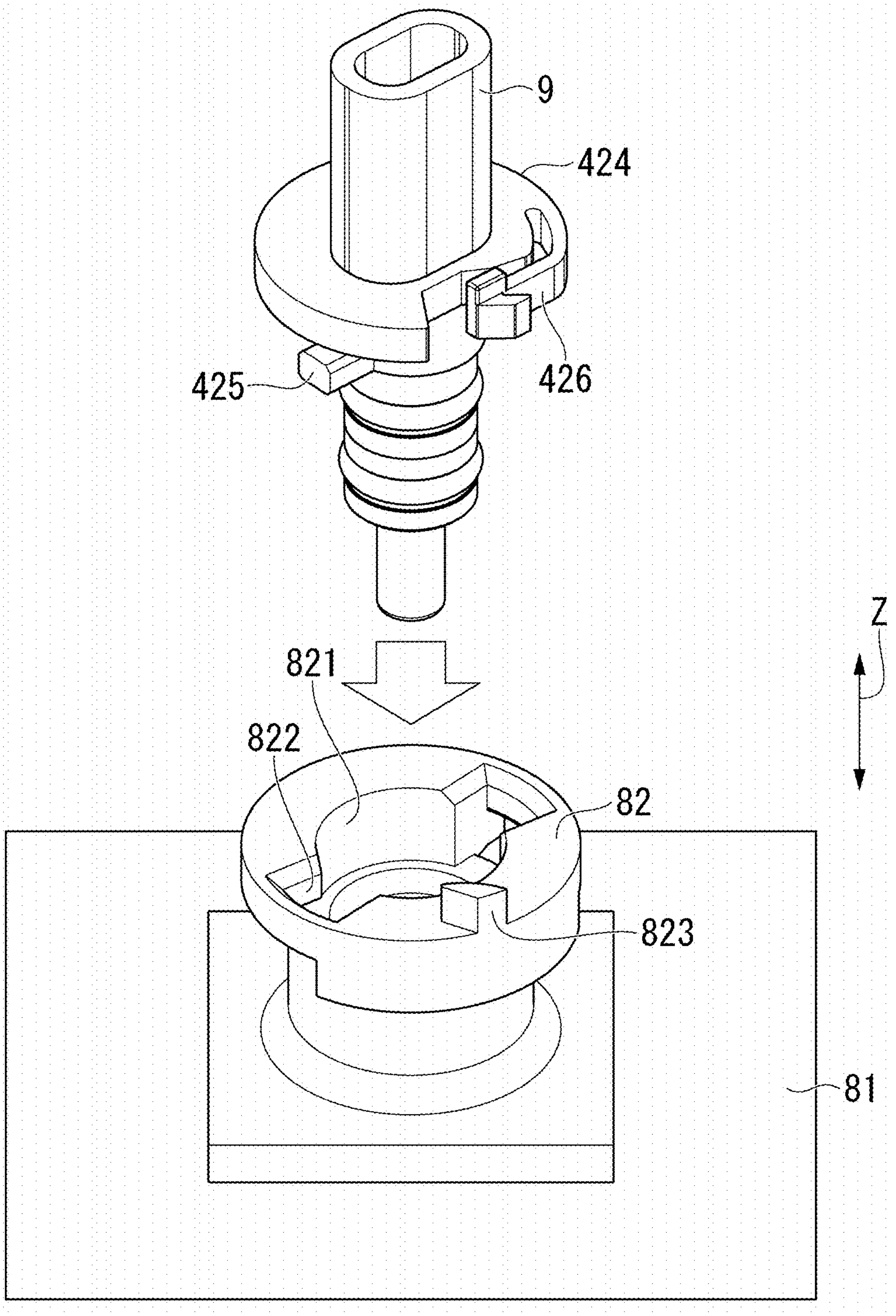
FIG. 7 is a perspective view showing a step of inserting the sensor unit according to an embodiment.

First, as illustrated in FIG. 7, the operator inserts the sensor unit 9 into a seat surface 82 that is fixed to the structural body 81 until the flange 424 comes into contact with the seat surface 82. Here, the seat surface 82 includes an opening 821 that opens towards an internal of the structural body 81 through which the fluid flows or in which the fluid is stored. The seat surface 82 includes a first lock portion 822 that is a pocket and communicated with part of the opening 821 and a second lock portion 823 protruding from the seat surface 82. With respect to such a seat surface 82, the operator inserts the sensor unit 9 into the opening 821 until the pair of extension portions 425 are accommodated in the first lock portion 822.

Figure 8:
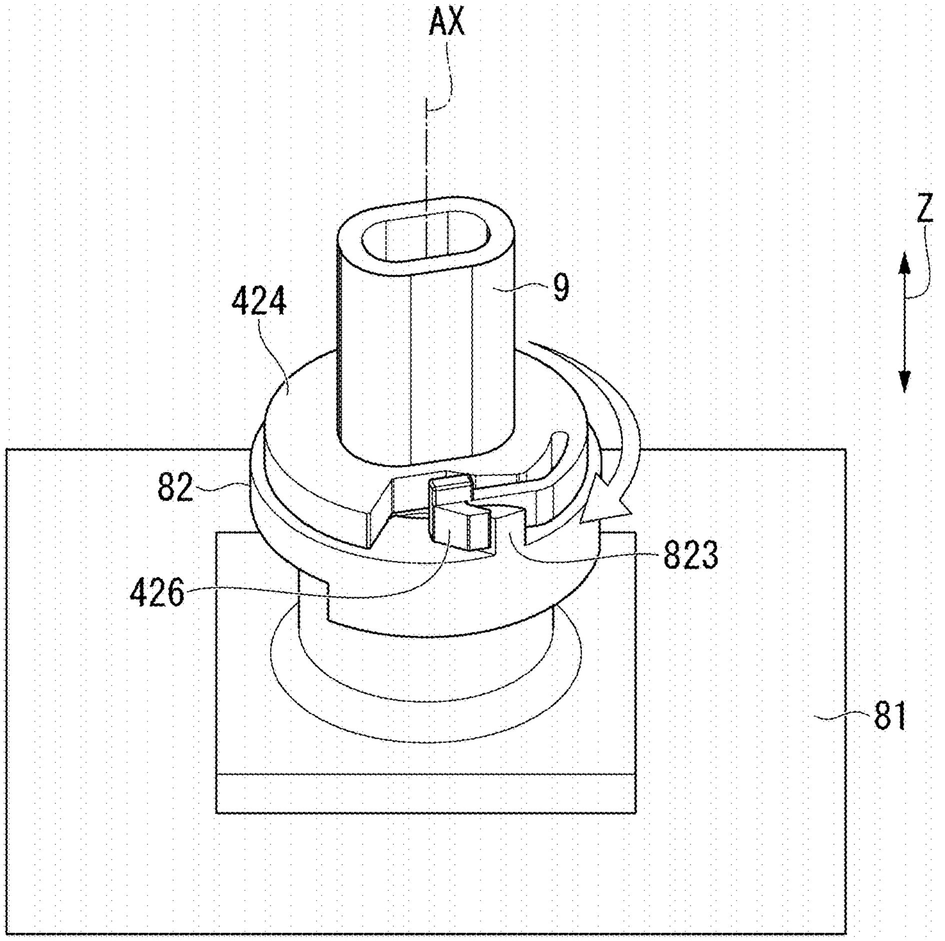
FIG. 8 is a perspective view showing a step of fitting the sensor unit according to an embodiment.

Subsequently, as illustrated in FIG. 8, the operator rotates the sensor unit 9 about an axis AX, which extends in the central axis of the sensor unit 9, hooks the pair of extension portions 425 on the first lock portion 822, and hooks the rotation stopper mechanism 426 on the second lock portion 823. This operation allows the operator to fit the sensor unit 9 onto the seat surface 82. In this manner, the pair of extension portions 425 and the rotation stopper mechanism 426 fix the sensor unit 9 to the structural body 81, such that a tip end of the sensor unit 9 corresponding to a position in the Z direction, where the sensor element 2 is provided, comes into contact with the fluid in the structural body 81.

(Operation and Effects)

The sensor unit 9 is provided with the through-hole 32H in a part where the resin-molded portion 4 is molded. With such a structure, the resin-molded portion 4 is molded through the through-hole 32H. By molding in this manner, it is possible to reinforce the fixing of the resin-molded portion 4 to the pair of conductive members 3. Therefore, in the sensor unit 9, the resin-molded portion 4 can be suppressed from coming off from the pair of conductive members 3.

The sensor unit 9 is provided with the bent portion 321 and the through-hole 32H in the part where the resin-molded portion 4 is molded. With these constitutions, the resin-molded portion 4 can be formed to be caught by the bent portion 321 in the part where the resin-molded portion 4 is molded through the through-hole 32H. Such a bent portion 321 is capable of reinforcing the fixing of the resin-molded portion 4 to the pair of conductive members 3. Therefore, in the sensor unit 9, the resin-molded portion 4 can be suppressed from coming off from the pair of conductive members 3.

The sensor unit 9 is provided with the through-hole 32H in a part where the second molded portion 42 is molded. With such a constitution, the second molded portion 42 is molded through the through-hole 32H, and thus it is possible to reinforce the fixing of the second molded portion 42 to the pair of conductive members 3. With such reinforcement, in the sensor unit 9, the second molded portion 42 can be suppressed from coming off from the first molded portion 41, regardless of the shape of the joint portion between the first molded portion 41 and the second molded portion 42. Therefore, the shape of the first molded portion 41 can be simplified and the sensor unit 9 can be downsized, compared with a constitution in which a complex structure is provided in the first molded portion 41 to suppress the first molded portion 41 from coming off from the second molded portion 42.

The sensor unit 9 is provided with the protruding portion 411. Thus, the second molded portion 42 shrinks so as to come into contact with a circumferential surface of the protruding portion 411 when the resin-molded portion 4 is molded. Such shrinkage reduces a gap at an interface between the first molded portion 41 and the second molded portion 42.

The sensor unit 9 is provided with the protruding portion 411 and thus a creepage distance in the joint surface 41*s* is lengthened. By lengthening the creepage distance, leakage current due to migration can be suppressed.

Figure 9:
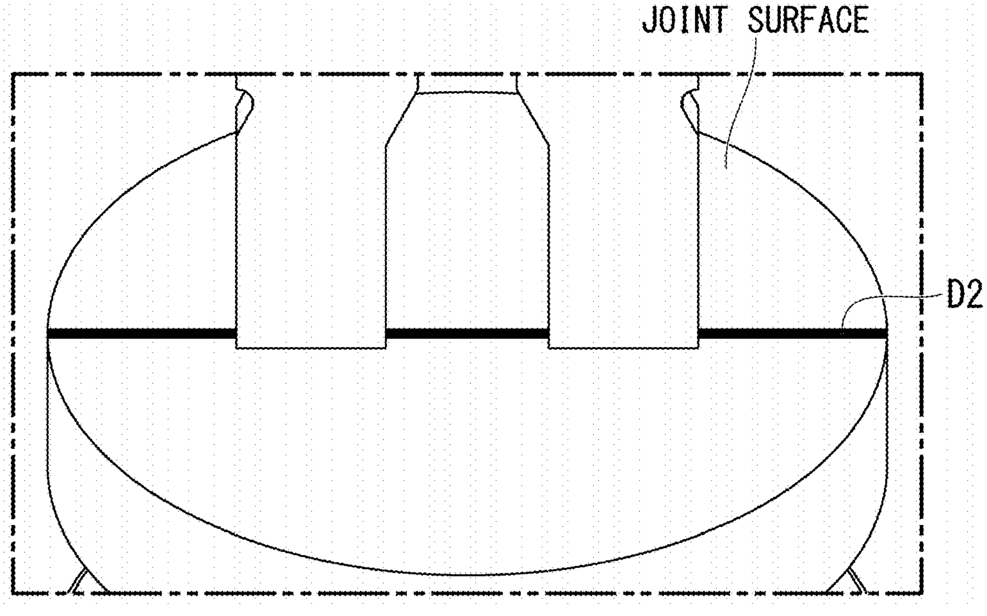
FIG. 9 is a perspective view showing a creepage distance according to a comparative example.
Figure 10:
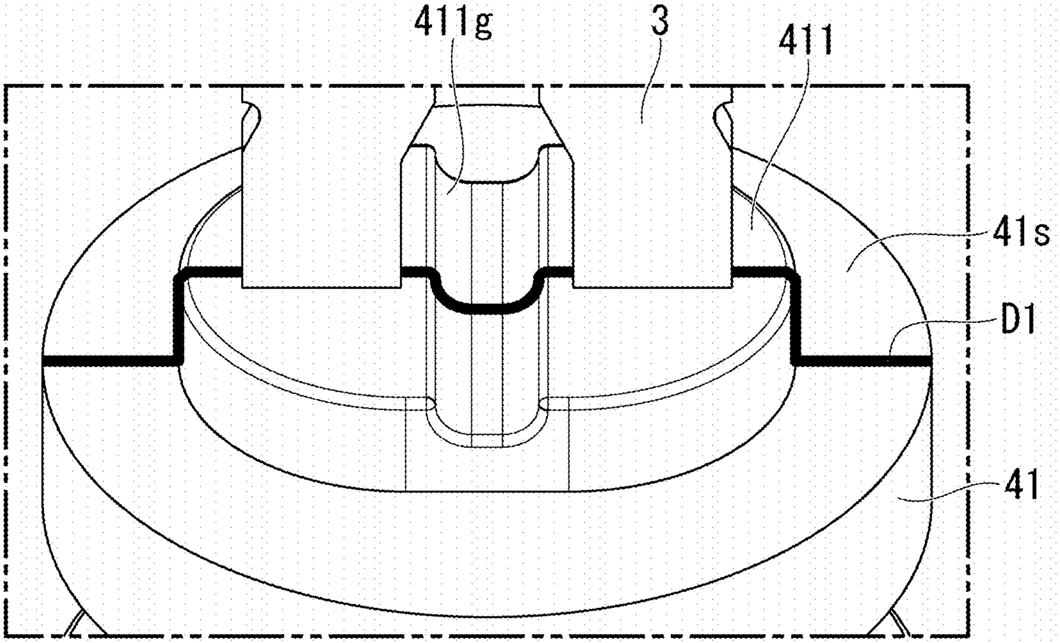
FIG. 10 is a perspective view showing a creepage distance according to an embodiment.

As a comparative example, as illustrated in FIG. 9, in the case where the joint surface is a flat surface, a creepage distance D2 in the joint surfaces is a linear distance. In contrast, as illustrated in FIG. 10, according to the sensor unit 9 in the present embodiment, a creepage distance D1 in the joint surface 41*s* is a distance along undulations of the protruding portion 411. These undulations cause the creepage distance D1 in the joint surface 41*s* of the sensor unit 9 in the present embodiment to be longer than the creepage distance D2 in the comparative example.

According to the sensor unit 9, the protruding portion 411 has an elliptical shape when viewed from the Z direction. With such a shape, when assembling the sensor unit 9, the stress generated by the rotational torque applied to the second molded portion 42 can be received by not only the pair of conductive members 3 but also by the protruding portion 411. With such a structure, the stress applied to the pair of conductive members 3 can be reduced. Therefore, an improvement in the strength of the sensor unit 9 is obtained with respect to the stress generated in assembling the sensor unit 9.

In particular, the frictional force generated between the resin-molded portion 4 and the first seal member 5 and the frictional force generated between the resin-molded portion 4 and the second seal member 6 are added to the stress generated by the rotational torque of the second molded portion 42, thus increasing the generated stress. Therefore, the fact that is able to reduce the stress applied to the pair of conductive members 3 is effective in the improvement in the strength of the sensor unit 9.

According to the sensor unit 9, the protruding portion 411 has an elliptical shape when viewed from the Z direction. The elliptical shape is a shape in which the stress generated in the second molded portion 42 in accordance with the rotational torque is less likely to concentrate than a shape having a corner. Therefore, as long as the protruding portion 411 has an elliptical shape, cracking is unlikely to occur on the second molded portion 42.

The sensor unit 9 is provided with the groove portion 411*g*, and thus the creepage distance in the joint surface 41*s* is lengthened. By lengthening the creepage distance, leakage current due to migration can be suppressed.

According to the sensor unit 9, the first seal member 5 and the second seal member 6 sandwich the joint surface 41*s* and the joint surface 42*s*. Such a structure enables the first seal member 5 to suppress the fluid from entering the interface between the first molded portion 41 and the second molded portion 42 from the structural body 81 side. In addition, the second seal member 6 is capable of suppressing the fluid from entering the interface between the first molded portion 41 and the second molded portion 42 from the flange 424 side.

According to the sensor assembly 1, when the resin-molded portion is molded for the sensor assembly 1, the through-hole 32H is provided in a part where the resin-molded portion 4 is molded. With such a structure, the resin-molded portion 4 is molded through the through-hole 32H. By molding in this manner, it is possible to reinforce the fixing of the resin-molded portion 4 to the pair of conductive members 3. Therefore, in the sensor assembly 1, the resin-molded portion 4 can be suppressed from coming off from the pair of conductive members 3.

First Modification

Figure 11:
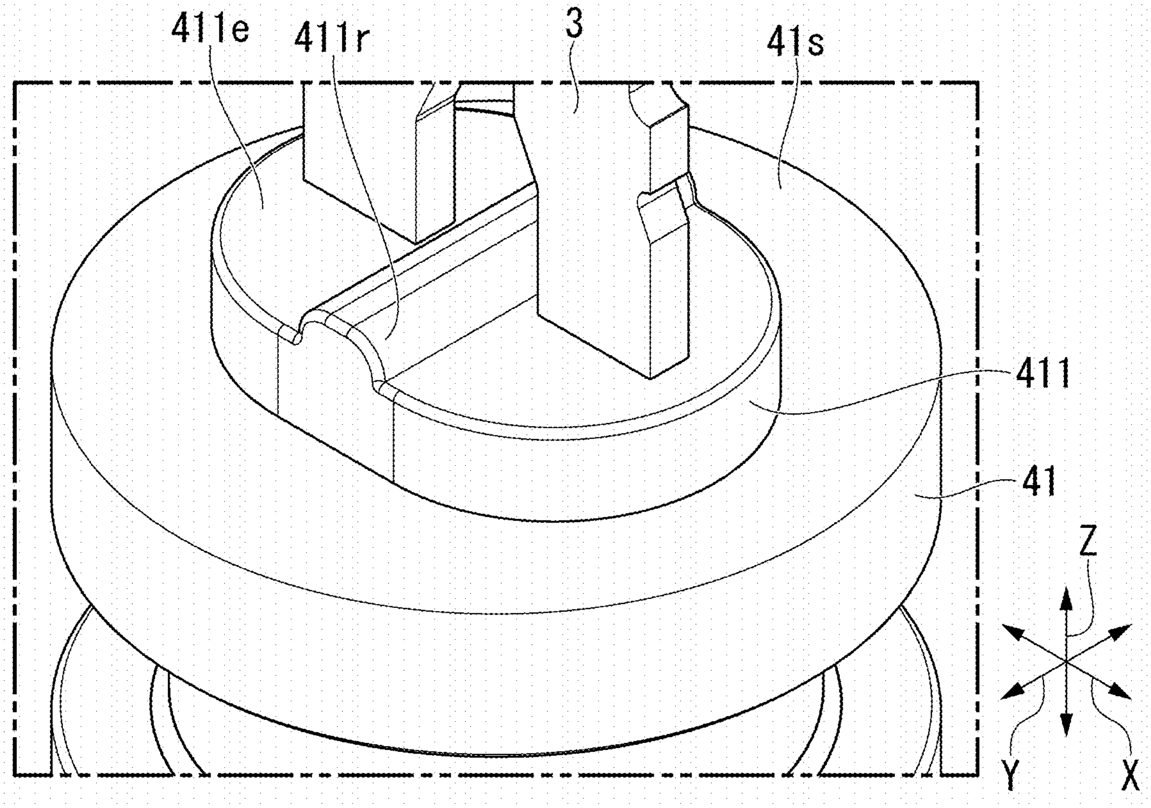
FIG. 11 is a partial perspective view of a pair of conductive members and a first molded portion according to a first modification of an embodiment.

In the present embodiment, the protruding portion 411 may have an optional constitution, instead of or in addition to the groove portion 411*g*. As a first modification, as illustrated in FIG. 11, the protruding portion 411 may include a bulging portion 411*r*, instead of the groove portion 411*g*. The bulging portion 411*r* bulges in the Z direction toward the second molded portion 42. The bulging portion 411*r* extends between the pair of conductive members 3 on the end surface 411*e* of the protruding portion 411 to traverse the end surface 411*e* when viewed from the Z direction. In the case where the protruding portion 411 includes the bulging portion 411*r*, it becomes possible to lengthen the creepage distance in the joint surface 41*s*.

Second Modification

Figure 12:
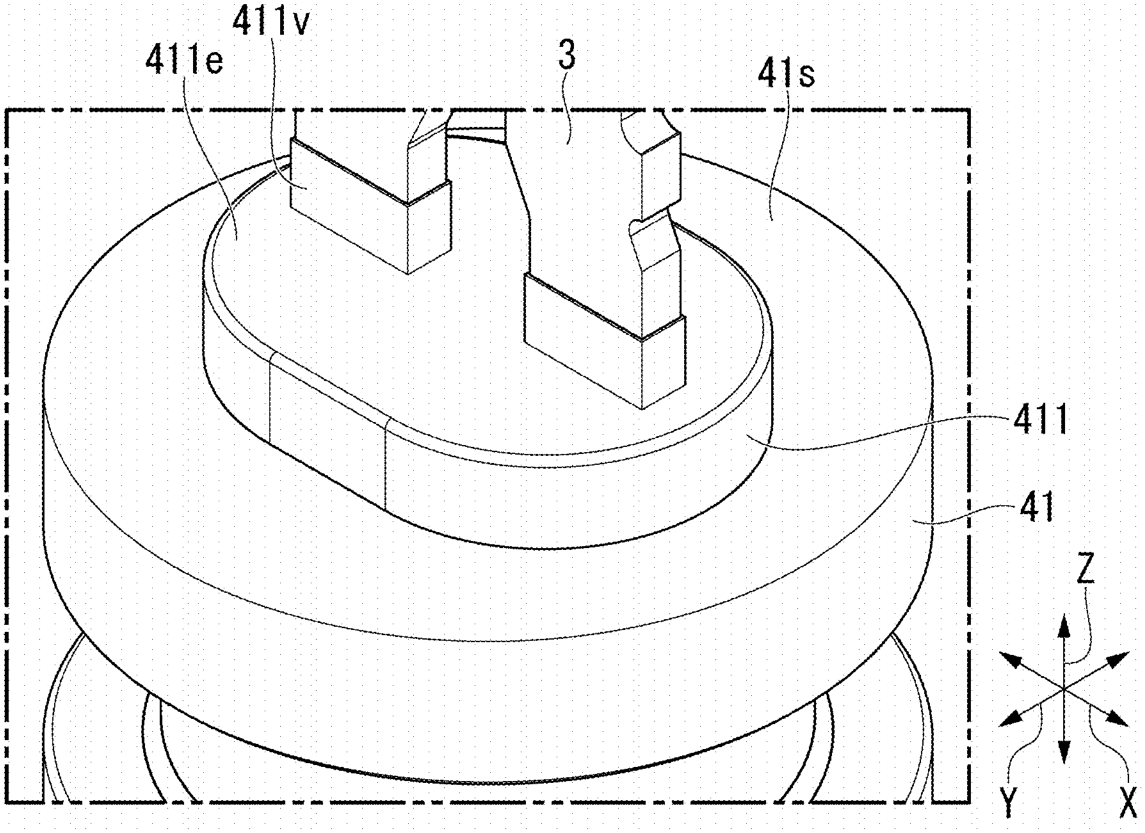
FIG. 12 is a partial perspective view of a pair of conductive members and a first molded portion according to a second modification of an embodiment.

In the present embodiment, the protruding portion 411 includes the groove portion 411*g*. Alternatively, the protruding portion 411 may be constituted in any manner. As a second modification, as illustrated in FIG. 12, the protruding portion 411 may include a sleeve portion 411*v*. The sleeve portion 411*v* stands up from the end surface 411*e* to surround the periphery of each conductive member 3. In the case where the protruding portion 411 includes the sleeve portion 411*v*, it becomes possible to lengthen the creepage distance in the joint surface 41*s*.

(Other Modifications)

In the present embodiment, the protruding portion 411 has an elliptical shape when viewed from the Z direction. Alternatively, the protruding portion 411 may have any shape when viewed from the Z direction. As a modification, the protruding portion 411 may have a non-perfect circular shape such as a polygonal shape, a letter I shape, a letter S shape, a letter U shape, or a letter X shape when viewed from the Z direction. In the case where the protruding portion 411 has a non-perfect circular shape, the stress generated by the rotational torque of the second molded portion 42 can be received by the protruding portion 411 when assembling the sensor unit 9. As another modification, when assembling the sensor unit 9, in the case where the stress generated by the rotational torque of the second molded portion 42 is to the extent that does not affect the strength of the sensor unit 9, the protruding portion 411 may have a perfect circular shape when viewed from the Z direction.

In the present embodiment, the pair of conductive members 3 is a lead frame. Alternatively, the pair of conductive members 3 may be constituted of any material such as a metal plate or a metal rod, as long as the material has conductivity.

In the present embodiment, after the first molded portion 41 is molded by transfer molding, the second molded portion 42 is molded by injection molding. Alternatively, the resin-molded portion 4 may be molded in any manner, as long as the resin-molded portion 4 includes the first molded portion 41 and the second molded portion 42. As a modification, after the first molded portion 41 is molded by injection molding, the second molded portion 42 may be molded by injection molding. As another modification, after the first molded portion 41 is molded by transfer molding, the second molded portion 42 may be molded by transfer molding.

In the present embodiment, the resin-molded portion 4 seals the base end portion 31 and the sensor element 2. Alternatively, the resin-molded portion 4 may be constituted in any manner, as long as it covers the base end portion 31 and the sensor element 2. As a modification, the resin-molded portion 4 may include a hollow resin-molded cap, and such a hollow resin-molded cap may cover a part to which the sensor element 2 of the base end portion 31 is connected, and the sensor element 2.

In the present embodiment, the first molded portion 41 is formed of an epoxy resin. Alternatively, the first molded portion 41 may be formed of any material. For example, in the case where the sensor unit 9 measures the temperature of the cooling water, the first molded portion 41 may be formed of any material having water resistance. For example, in the case where the sensor unit 9 measures the temperature of the oil, the first molded portion 41 may be formed of any material having oil resistance. In addition, in the present exemplary embodiment, the second molded portion 42 is made of a polyamide (PA) resin or a polyphenylene sulfide (PPS) resin. Alternatively, the second molded portion 42 may be formed of any material.

In the present embodiment, the resin-molded portion 4 includes the first molded portion 41 and the second molded portion 42. Alternatively, the resin-molded portion 4 may include only one molded portion. That is, the resin-molded portion 4 may be molded by one-color molding instead of two-color molding.

In the present embodiment, the sensor element 2 is a temperature sensor. Alternatively, the sensor element 2 is not limited to a temperature sensor, and may be any sensor.

In the present embodiment, the through-hole 32H is a circular hole. Alternatively, the through-hole 32H may have any shape. The through-hole 32H may be a perfect circular hole or an elliptical hole, as the circular hole. Alternatively, as a modification, the through-hole 32H may be a polygonal hole. As another modification, the through-hole 32H may be a slit opening.

In the present embodiment, the remaining widths W1 and W2 are widths capable of maintaining the mechanical strength of each conductive member 3. As a modification, the sum of the remaining width W1 and the remaining width W2 may be constituted to be larger than half of the width W3 so that the mechanical strength of each conductive member 3 can be further maintained.

Heretofore, embodiments of the present disclosure have been described.

However, these embodiments are examples, and are not intended to limit the scope of the present disclosure. The embodiments can be implemented in various other forms, and various omissions, substitutions, and changes can be made without departing from the gist of the present disclosure.

<Supplementary Note>

Some sensor units and sensor assemblies will be additionally described below.

[1]

A sensor unit includes:

a sensor element;

a pair of conductive members that extend in parallel with each other from the sensor element; and a resin-molded portion that covers part of the pair of conductive members, wherein the pair of conductive members each includes:

a base end portion connected to the sensor element;

a tip end portion on an opposite side to the base end portion; and an intermediate portion that is a part between the base end portion and the tip end portion, the intermediate portion including a through-hole, and wherein the resin-molded portion covers the base end portion and the intermediate portion while the tip portion is exposed.

According to the constitution of the above [1], the through-hole is provided in a part where the resin-molded portion is molded. With such a structure, the resin-molded portion is molded through the through-hole. By molding in this manner, it is possible to reinforce the fixing of the resin-molded portion to the pair of conductive members. Therefore, in the sensor unit, the resin-molded portion can be suppressed from coming off from the pair of conductive members.

[2]

In the sensor unit described in [1], the intermediate portion includes a bent portion in which the pair of conductive members are bent in directions away from each other, and the through-hole is formed in the bent portion.

According to the constitution of the above [2], the bent portion and the through-hole are provided in the part where the resin-molded portion is molded. With these constitutions, the resin-molded portion can be constituted to be caught by the bent portion in the part where the resin-molded portion is molded through the through-hole. With such a constitution, it is possible to reinforce the fixing of the resin-molded portion to the pair of conductive members. Therefore, in the sensor unit, the resin-molded portion can be suppressed from coming off from the pair of conductive members.

[3]

In the sensor unit described in [1] or [2], the resin-molded portion includes:

a first molded portion that covers the base end portion; and a second molded portion that covers the intermediate portion and that is joined to the first molded portion.

According to the constitution of the above [3], the through-hole is provided in a part where the second molded portion is molded. With such a constitution, the second molded portion is molded through the through-hole, and thus it is possible to reinforce the fixing of the second molded portion to the pair of conductive members. With such reinforcement, in the sensor unit, the second molded portion can be suppressed from coming off from the first molded portion, regardless of the shape of the joint portion between the first molded portion and the second molded portion. Therefore, the shape of the first molded portion can be simplified and the sensor unit can be downsized.

[4]

In the sensor unit described in [3], the first molded portion includes a protruding portion that protrudes toward the second molded portion on a joint surface with the second molded portion, and the pair of conductive members are disposed to pass through the protruding portion.

According to the constitution of the above [4], the protruding portion is provided. Thus, the second molded portion shrinks to come into contact with the circumferential surface of the protruding portion when the resin-molded portion is molded. Therefore, the gap at the interface between the first molded portion and the second molded portion is reduced.

In place of or in addition to the above operation, according to the constitution of the above [4], by providing the protruding portion, the creepage distance on the joint surface is lengthened. By lengthening a creepage distance, leakage current due to migration can be suppressed.

[5]

In the sensor unit in [4], the protruding portion has a non-perfect circular shape when viewed from a joining direction of the first molded portion and the second molded portion.

According to the constitution of the above [5], when assembling the sensor unit, the stress generated by the rotational torque of the second molded portion can be received by not only the pair of conductive members but also by the protruding portion. With such a structure, the stress applied to the pair of conductive members can be reduced. Therefore, an improvement in the strength of the sensor unit is obtained with respect to the stress generated in assembling the sensor unit.

[6]

In the sensor unit described in [4] or [5], the protruding portion includes, between the pair of conductive members on an end surface of the protruding portion, either a groove portion or a bulging portion that extends to traverse the end surface when viewed from a joining direction of the first molded portion and the second molded portion.

According to the constitution of the above [6], by providing the groove portion or the bulging portion, the creepage distance on the joint surface is lengthened. By lengthening a creepage distance, leakage current due to migration can be suppressed.

[7]

A sensor assembly includes:

a sensor element; and a pair of conductive members that extend in parallel with each other from the sensor element, wherein the pair of conductive members each includes:

a base end portion connected with the sensor element;

a tip end portion on an opposite side to the base end portion; and an intermediate portion that is a part between the base end portion and the tip end portion, the intermediate portion including a through-hole.

According to the constitution of the above [7], when the resin-molded portion is molded for the sensor assembly, the through-hole is provided in a part where the resin-molded portion is molded. With such a structure, the resin-molded portion is molded through the through-hole. By molding in this manner, it is possible to reinforce the fixing of the resin-molded portion to the pair of conductive members. Therefore, in the above sensor assembly, the resin-molded portion can be suppressed from coming off from the pair of conductive members.

INDUSTRIAL APPLICABILITY

According to the sensor unit or the sensor assembly in the above disclosure, a resin-molded portion can be suppressed from coming off from a pair of conductive members of the sensor assembly.

BRIEF DESCRIPTION OF THE REFERENCE SYMBOLS

1 Sensor assembly
2 Sensor element
3 Conductive member
4 Resin-molded portion
5 First seal member
6 Second seal member
9 Sensor unit
31 Base end portion
32 Intermediate portion
32H Through-hole
33 Tip end portion
41 First molded portion
41*s* Joint surface
42 Second molded portion
42*s* Joint surface
81 Structural body
82 Seat surface
321 Bent portion
411 Protruding portion
411*e* End surface
411*g* Groove portion
411*r* Bulging portion
411*v* Sleeve portion
413 First seal groove
421 First recessed portion
422 Second recessed portion
423 Second seal groove
424 Flange
425 Extension portion
426 Rotation stopper mechanism
821 Opening
822 First lock portion
823 Second lock portion
AX Axis
D1 Creepage distance
D2 Creepage distance
P1 First edge portion
P2 Second edge portion

What is claimed is:

1. A sensor unit comprising:

a sensor element;

a pair of conductive members that extend in parallel with each other from the sensor element; and a resin-molded portion that covers part of the pair of conductive members, wherein the pair of conductive members each includes:

a base end portion connected with the sensor element;

a tip end portion on an opposite side to the base end portion; and an intermediate portion that is a part between the base end portion and the tip end portion, the intermediate portion including a through-hole, and wherein the resin-molded portion covers the base end portion and the intermediate portion while the tip portion is exposed, wherein the intermediate portion includes a bent portion in which the pair of conductive members are bent in directions away from each other, and wherein the through-hole is formed in the bent portion.

2. The sensor unit according to claim 1, wherein the resin-molded portion includes:

a first molded portion that covers the base end portion; and a second molded portion that covers the intermediate portion and that is joined to the first molded portion.

3. The sensor unit according to claim 2, wherein the first molded portion includes a protruding portion that protrudes toward the second molded portion on a joint surface with the second molded portion, and the pair of conductive members are disposed to pass through the protruding portion.

4. The sensor unit according to claim 3, wherein the protruding portion has a non-perfect circular shape when viewed from a joining direction of the first molded portion and the second molded portion.

5. The sensor unit according to claim 3, wherein the protruding portion includes, between the pair of conductive members on an end surface of the protruding portion, either a groove portion or a bulging portion that extends to traverse the end surface when viewed from a joining direction of the first molded portion and the second molded portion.

6. A sensor assembly comprising:

a sensor element; and a pair of conductive members that extend in parallel with each other from the sensor element, wherein the pair of conductive members each includes:

a base end portion connected to the sensor element;

a tip end portion on an opposite side to the base end portion; and an intermediate portion that is a part between the base end portion and the tip end portion, the intermediate portion including a through-hole, wherein the intermediate portion includes a bent portion in which the pair of conductive members are bent in directions away from each other, and wherein the through-hole is formed in the bent portion.

* * * * *